| United States Patent [19] | | [11] | 4,323,665 |
|---|---|---|---|
| Lowery, Jr. et al. | | [45] | Apr. 6, 1982 |

[54] HIGH EFFICIENCY CATALYST FOR POLYMERIZING OLEFINS

[75] Inventors: Kirby Lowery, Jr., Lake Jackson; Donald F. Birkelbach, Angleton; Randall S. Shipley, Alvin, all of Tex.

[73] Assignee: The Dow Chemical Co., Midland, Mich.

[21] Appl. No.: 140,408

[22] Filed: Apr. 14, 1980

Related U.S. Application Data

[60] Division of Ser. No. 27,974, Apr. 9, 1979, Pat. No. 4,224,186, which is a continuation-in-part of Ser. No. 939,632, Sep. 5, 1978, abandoned.

[51] Int. Cl.$^3$ .......................... C08F 4/02; C08F 10/00
[52] U.S. Cl. ..................................... 526/122; 526/150; 526/151; 526/352
[58] Field of Search .............................. 526/122, 150

[56] References Cited

U.S. PATENT DOCUMENTS

| 4,071,672 | 1/1978 | Kashiwa | 526/122 |
|---|---|---|---|
| 4,085,276 | 4/1978 | Toyota et al. | 526/122 |
| 4,104,198 | 8/1978 | May et al. | 526/151 |
| 4,115,319 | 9/1978 | Scata et al. | 526/128 |
| 4,120,820 | 10/1978 | Birkelbach | 526/151 |

FOREIGN PATENT DOCUMENTS

| 49-14864 | 4/1974 | Japan | 526/122 |
|---|---|---|---|
| 1492379 | 11/1977 | United Kingdom . | |
| 1500873 | 2/1978 | United Kingdom . | |

*Primary Examiner*—Edward J. Smith
*Attorney, Agent, or Firm*—J. G. Carter

[57] ABSTRACT

α-Olfins, particularly higher olefins, are polymerized in the presence of a catalyst prepared by reacting (A) tetravalent tianium compounds such as titanium tetraalkoxide, (B) an organoaluminum compound, (C) an organomagnesium component such as a hydrocarbon soluble complex of dialkyl magnesium and an organoaluminum compound such as triethyl aluminum and, (D) as a halide source, a tetravalent tin compound such as tin tetrachloride. Polymers prepared by this process provide higher efficiencies than polymers prepared from a process utilizing catalysts employing HCl as the halide source.

24 Claims, No Drawings

HIGH EFFICIENCY CATALYST FOR POLYMERIZING OLEFINS

CROSS REFERENCE TO RELATED APPLICATION

This is a division of application Ser. No. 27,974, filed Apr. 9, 1979, now U.S. Pat. No. 4,224,186, which is a continuation-in-part of application Ser. No. 939,632, filed Sept. 5, 1978, now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4B, 5B, 6B and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. No. 3,392,159, U.S. Pat. No. 3,737,393, West German Patent Application No. 2,231,982 and British Pat. Nos. 1,305,610 and 1,358,437. While the increased efficiencies achieved by using these recent catalysts are significant, even higher efficiencies are desirable particularly in copolymerization processes. These high efficiency catalysts generally produce polymers of relatively narrow molecular weight distribution.

In view of the foregoing problems encountered in the use of conventional Ziegler catalysts, it would be highly desirable to provide a polymerization catalyst that is sufficiently active, even at solution polymerization temperature above 140° C., to produce such high quantities of olefin homopolymers or copolymers per unit of catalyst that it is no longer necessary to remove catalyst residue in order to obtain a polymer of the desired purity.

SUMMARY OF THE INVENTION

The present invention, in one aspect, is an improvement in the catalytic reaction product of (A) a tetravalent titanium compound or a complex of a trivalent titanium compound with an electron donor, (B) an organoaluminum compound, (C) an organo magnesium component and (D) a halide source; the improvement being the use of a tetravalent tin compound as the halide source. The magnesium component is (1) a complex of an organomagnesium compound and an organometallic compound which solubilizes the organomagnesium compound in a hydrocarbon solvent or (2) an organomagnesium compound. The halide source is a tetravalent tin halide corresponding to the formula $SnX_aR_{4-a}$ wherein R is a monovalent organic radical usually hydrocarbyl or hydrocarbyloxy, X is halogen, and a is a number from 1 to 4. The proportions of the foregoing components of said catalytic reaction products are such that the atomic ratios of the elements are:

Mg:Ti is from about 1:1 to about 2000:1; preferably from about 5:1 to about 200:1, most preferably from about 5:1 to about 75:1;

Al:Ti is from about 0.1:1 to about 2000:1; preferably from about 0.5:1 to about 200:1; most preferably from about 1:1 to about 75:1;

Sn:Mg is from about 0.10:1 to about 2:1; preferably from about 0.25:1 to about 1.5:1; most preferably from about 0.5:1 to about 1:1;

excess X:Al is from about 0.0005:1 to about 10:1; preferably from about 0.002:1 to about 2:1; most preferably from about 0.01:1 to about 1.4:1.

The excess X is excess halide above that which would be theoretically required to convert the magnesium compound to the dihalide.

In a second aspect, the invention is a process for polymerizing at least one α-olefin under conditions characteristic of Ziegler polymerization wherein the aforementioned reaction product is employed as the catalyst.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin polymer or copolymer per pound of transition metal under such polymerization conditions. Accordingly, olefin polymers produced in accordance with the foregoing process generally contain lower amounts of catalyst residues than polymers produced in the presence of conventional catalyst even after subjecting such conventionally produced polymers to catalyst removal treatments. Further, these catalytic reaction products provide higher efficiencies than corresponding catalysts employing other halide sources, particularly HCl.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene with higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts, i.e. up to about 25 weight percent based on the copolymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40 weight percent of propylene, butene-1, hexene-1, octene-1, 4-methylpentene-1, 1,7-octadiene or similar α-olefin or diolefin based on total monomer.

Suitable tetravalent tin compounds include those represented by the formula $SnX_aR_{4-a}$ wherein R is a monovalent organic radical usually hydrocarbyl or hydrocarbyloxy as hereinafter defined, X is halogen, particularly chlorine or bromine and a is a number from 1 to 4. Particularly suitable tetravalent tin compounds are tin tetrachloride, butyltin trichloride, diethytin dichloride, diethyltin dibromide, phenyltin trichloride, mixtures thereof and the like.

Advantageously, the tetravalent titanium compound is represented by the empirical formula: $TiX_n(OR)_{4-n}$ wherein X is a halogen, particularly chlorine or bromine, R is an alkyl or an aryl group having from 1 to 12 carbon atoms and n has a value of 0 to 4. Such titanium compounds are preferably derived from the titanium halides wherein one or more of the halogen atoms are replaced by an alkoxy or aryloxy group. Exemplary of such compounds include tetrabutoxy titanium, tetra(isopropoxy)titanium, dibutoxy titanium dichloride, monoethoxy titanium trichloride, tetraphenoxytitanium and the like.

Advantageously, the trivalent titanium complex is represented by the empirical formula: $TiZ_3(L)_x$ wherein Z is halide, and L is an electron donating compound such as water or an organic electron donor, e.g., alcohol, ether, ketone, amine or olefin, and x is a number from 1 to 6. Usually, the organic electron donor has from 1 to 12 carbon atoms and donates an unshared pair of electrons to the complex. In preferred complexes, Z is chloride or bromide, most preferably chloride, and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4, coordination bonds to the electron donating compound. The titanium halide complex is most advantageously prepared by heating the trivalent titanium halide dispersed in the electron donating compound under nitrogen or similar inert atmosphere. Usually the formation of the complex is visually indicated by a definite change in color. For example, when the dark purple α-TiCl₃ is heated in anhydrous isopropyl alcohol under nitrogen, complex formation is indicated by the formation of a brilliant blue solution. The complex is normally solid; however, liquid complexes would be suitable.

In addition to a α-TiCl₃, the Δ, γ and β crystalline forms of titanium trichloride are advantageously employed in the preparation of the complex. Also suitable are titanium tribromide, titanium trifluoride and the like. Of the foregoing, the Δ- and α- forms of titanium trichloride are preferred. Exemplary electron donating compounds suitably employed include aliphatic alcohols, e.g., isopropyl alcohol, ethanol, n-propyl alcohol, butanol and others having from 1 to 10 carbon atoms; ethers; ketones; aldehydes; amines; olefins, and the like having from 1 to 12 carbon atoms and water.

The preferred organomagnesium component is a hydrocarbon soluble complex illustrated by the formula $MgR''_2 xMR''_y$ wherein each R'' is independently hydrocarbyl or hydrocarbyloxy, M is aluminum, zinc or mixtures thereof and x is about 0.001 to 10, especially from about 0.15 to about 2.5 and y denotes the number of hydrocarbyl groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms are preferred. Hydrocarbyl is preferred over hydrocarbyloxy. This complex is prepared by reacting particulate magnesium such as magnesium turnings, or magnesium particles with about a stoichiometric amount of hydrocarbyl or hydrocarbyloxy halide, illustrated as R'X. The resulting hydrocarbon insoluble $MgR''_2$ is solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount of $MgR''_2$, e.g., at least 5 weight percent of $MgR''_2$ is solubilized. It is preferred to solubilize at least 50 weight percent of the $MgR''_2$ and especially preferred to solubilize all the $MgR''_2$. When employing a mixture of $AlR''_3$ and $ZnR''_2$ to solubilize $MgR''_2$, the atomic ratio of Zn to Al is from about 3000:1 to about 0.1:1, preferably from about 350:1 to about 1:1. In order to obtain maximum catalyst efficiency at polymerization temperatures above 180° F., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than AlR″$_3$, ZnR″$_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbons, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein alkyl has from 1 to 20 carbon atoms. Exemplary suitable magnesium diaryls include diphenylmagnesium, dibenzylmagnesium, and ditolylmagnesium, being especially preferred. Suitable organomagnesium compounds include alkyl and aryl magnesium alkoxides and aryloxides and aryl and alkyl magnesium halides with the halogen-free organomagnesium compounds being more desirable.

Suitable organoaluminum compounds include those represented by the formula $AlR_{3-a}X_a$ wherein R is hydrocarbyl, hydrocarbyloxy or as herein-before defined such as alkyl, X is a halogen and a is a number from zero to 3. Most preferred are the aluminum alkyls such as for example triethyl aluminum, triisobutyl aluminum, diethylaluminum chloride, diethylaluminum bromide, mixtures thereof and the like.

It is understood that the organic moieties of the aforementioned organomagnesium, e.g., R″, and the organic moieties of the halide source, e.g., R and R′, are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst can be prepared by mixing the components of the catalyst in an inert liquid diluent in any order of addition so long as the tin halide and titanium compound are not present together in the absence of the aluminum compound. An especially preferred order of addition is: organomagnesium compound, halide source, organoaluminum compound and titanium compound or complex. The foregoing catalyst components are combined in proportions sufficient to provide atomic ratios as previously mentioned.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100 to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

If desired, the catalytic reaction product of this invention may also contain a dialkyl zinc component wherein the alkyl groups are the same or different and contain from 1 to about 10 carbon atoms. Suitable such dialkyl zinc compounds include, for example, diethyl zinc, diisopropyl zinc, di-n-propyl zinc, di-n-butyl zinc, di-sec-butyl zinc mixtures thereof and the like. Such zinc compounds tend to provide polymers of broadened molecular weight distribution.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0 to about 300° C., preferably at solution polymerization temperatures, e.g., from about 130° to about 250° C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer, is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture. It is understood that inert diluents employed in the polymerization recipe are suitably as defined hereinbefore.

The polymerization pressures preferably employed are relatively low, e.g., from about 50 to about 1000 psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present and thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the invention, and should not be construed as limiting its scope. All parts and percentages are by weight unless otherwise indicated.

The following atomic weight values were employed in the examples to calculate the ratios of the components.

Al = 26.98
C = 12.01
Cl = 35.45
H = 1.01
Mg = 24.31
Ni = 58.71
O = 16.00
Sn = 118.69
Ti = 47.90
Zn = 65.37.

In the following examples, the melt index values $I_2$ and $I_{10}$ were determined by ASTM D 1238-70 and the density values were determined by ASTM D 1248.

EXAMPLE 1

A. Preparation of the Catalyst Composition

The catalyst composition was prepared by adding with stirring under a nitrogen atmosphere to a 120 ml serum bottle the following components in the indicated order:

96.54 ml of Isopar ® E (an isoparaffinic hydrocarbon fraction having a boiling range of 240°–287° F.)
0.74 ml of 0.81 of M Mg(nC$_6$H$_{13}$)$_2$
1.35 ml of 0.25 M SnCl$_4$
0.77 ml of 0.97 M Al(C$_2$H$_5$)$_3$
0.60 ml of 0.025 M Ti(Oi-C$_3$H$_7$)$_4$ (TPT).

The temperature of the serum bottle was maintained at ambient temperature (22° C.) and reaction was observed to be complete within 5 minutes.

The atomic ratios of the catalyst components were as follows:

Mg/Ti = 40/1
Al/Ti = 50/1
Sn/Mg = 22.5/1
excess Cl/Al = 10/50 = 0.2/1

B. Polymerization

Into a stirred 5-liter batch lab reactor was added 2 liters of Isopar ® E and heated to 150° C. The solvent vapor pressure was about 21 psig. Then was added 19 psig of hydrogen and 160 psig of ethylene for a total reactor pressure of 200 psig. Ten ml (0.0015 m moles Ti) of the above catalyst was injected into the reactor, and the reactor pressure was maintained constant with ethylene. The total reaction time was 34 minutes; 190 gm of polyethylene was obtained for a yield of $2.65 \times 10^6$ gm PE/gm Ti.

EXAMPLES 2–5

A. Preparation of the Catalyst

Various catalysts were prepared by adding with stirring under a nitrogen atmosphere at ambient temperature (22° C.) to a 4 ounce (118.28 cc) serum bottle the following components in the order indicated.

| | |
|---|---|
| (97.77 − x) | ml of 2,2,4-trimethyl pentane |
| 0.97 | ml of 0.67 M di-n-hexyl magnesium |
| x | ml of 0.5 M tin tetrachloride (SnCl$_4$) |
| 0.66 | ml of 1.13 M Al(C$_2$H$_5$)$_3$ |
| 0.60 | ml of 0.025 M tetraisopropyl titanate [Ti(OiPr)$_4$] |
| 100 | ml total |

The quantities of SnCl$_4$ and the atomic ratios of the catalyst components are given in Table I.

B. Polymerization (Ex. 2–5)

A stirred batch reactor containing 2 liters of 2,2,4-trimethyl pentane (isooctane) was heated to 150° C. The solvent vapor pressure was 41 psig. To this was added 19 psig of hydrogen and 120 psig of ethylene for a total reactor pressure of 180 psig. Ten milliliters of the above catalyst was injected into the reactor (10 ml = 0.0015 m moles Ti), and the reactor pressure was maintained constant at 180 psig with ethylene. The total reaction time was 30 minutes. The polymerization results are given in Table II.

EXAMPLE 6 (Comparative)

A. Preparation of the Catalyst

The catalyst was prepared by the procedure indicated in (A) for examples 2–5 employing the following components in the order indicated.

98.68 ml of 2,2,4-trimethylpentane
0.75 ml 1.0 m ethylaluminum dichloride (as a halide source)
0.60 ml 0.025 m tetraisopropyl titanate
0.97 ml 0.67 m di-n-hexyl magnesium The atomic ratios of components for this catalyst were as follows:

Mg:Ti = 40:1
Al:Ti = 50:1
excess Cl:Al = 20:50 = 0.4:1

B. Polymerization Example 6 (comparative)

The polymerization conditions were as outlined previously with the following exceptions. The solvent vapor pressure was 40 psig, 17 psig of hydrogen and 133 psig of ethylene were added for a total pressure of 190 psig. The reactor pressure was controlled at 190 psig with ethylene.

TABLE I

| Example No. | x ml | Mg:Ti | Al:Ti | Sn:Ti | XsCl:Al |
|---|---|---|---|---|---|
| 2 | 1.02 | 40:1 | 50:1 | 33.75:1 | 1.1:1 |
| 3 | .85 | 40:1 | 50:1 | 28:1 | 0.64:1 |
| 4 | .90 | 40:1 | 50:1 | 30:1 | 0.8:1 |
| 5 | .79 | 40:1 | 50:1 | 26.25:1 | 0.5:1 |

TABLE II

| Example No. | Polymer Yield gms. | Efficiency gm polymer/gm Ti |
|---|---|---|
| 2 | 118 | 1.64 × 10$^6$ |
| 3 | 132 | 1.84 × 10$^6$ |
| 4 | 150 | 2.06 × 10$^6$ |
| 5 | 107 | 1.50 × 10$^6$ |
| 6 comparative | 99 | 1.38 × 10$^6$ |

We claim:

1. In a process for the polymerization of an α-olefin under the conditions characteristic of Ziegler polymerization wherein the polymerization is conducted in the presence of, as a catalyst for said polymerization, a catalytic reaction product of (A) a tetravalent titanium compound, (B) an organoaluminum compound, (C) an organomagnesium component and (D) a halide source; said catalytic reaction product having atomic ratios of Mg:Ti is from about 1:1 to about 2000:1;
Al:Ti is from about 0.1:1 to about 2000:1;
excess X:Al is from about 0.0005:1 to about 10:1;

the improvement which comprises employing as the halide source in said catalyst, a tetravalent tin halide represented by the formula SnX$_a$R$_{4-a}$, wherein X is a halogen, R is a hydrocarbyl or hydrocarbyloxy group and a has a value of 1 to 4 and the atomic ratio of Sn:Mg is from about 0.1:1 to about 2:1.

2. The process of claim 1 wherein the halide source is a tin tetrahalide, the organoaluminum compound is a trialkyl aluminum and wherein the catalytic reaction product has the following atomic ratios:

Mg:Ti is from about 5:1 to about 200:1;
Al:Ti is from about 0.5:1 to about 200:1;
Sn:Mg is from about 0.25:1 to about 1.5:1;
excess X:Al is from about 0.002:1 to about 2:1.

3. The process of claim 2 wherein the halide source is tin tetrachloride, the organoaluminum compound is triethyl aluminum or triisobutyl aluminum and wherein the catalytic reaction product has the following atomic ratios:

Mg:Ti is from about 5:1 to about 75:1;
Al:Ti is from about 1:1 to about 75:1;
Sn:Mg is from about 0.5:1 to about 1:1;
excess X:Al is from about 0.01:1 to about 1.4:1.

4. The process of claim 3 wherein the organomagnesium compound is a dihydrocarbyl magnesium.

5. The process of claim 4 wherein the dihydrocarbyl magnesium is n-butyl-sec-butyl magnesium di-n-hexyl magnesium, ethyl-n-butyl magnesium, di-isopropyl magnesium, or ethyl-n-hexyl magnesium.

6. The process of claim 3 wherein the organomagnesium component is a complex of a dialkyl magnesium and a trialkyl aluminum wherein the atomic ratio of Mg:Al in said complex is within the range of from about 0.3:1 to about 1000:1.

7. The process of claim 6 wherein the complex is di-n-butyl magnesium.1/6 triethyl aluminum.

8. The process of claims 1, 2, 3, 4, 5, 6 or 7 wherein component (A) is a tetrahydrocarbyloxy titanium compound.

9. The process of claim 8 wherein the tetravalent titanium compound is tetraiso-propoxy titanium.

10. The process of claims 1, 2, 3, 4, 5, 6 or 7 wherein said α-olefin is ethylene or a mixture of ethylene and one or more higher α-olefins and/or other ethylenically polymerizable compound.

11. The process of claim 10 wherein said α-olefin is a mixture of ethylene and at least one of butene-1, hexene-1 or octene-1.

12. The process of claim 8 wherein said α-olefin is ethylene or a mixture of ethylene and one or more higher α-olefins and/or other ethylenically polymerizable compound.

13. The process of claim 12 wherein said α-olefin is a mixture of ethylene and at least one of butene-1, hexene-1 or octene-1.

14. The process of claim 9 wherein said α-olefin is ethylene or a mixture of ethylene and one or more higher α-olefins and/or other ethylenically polymerizable compound.

15. The process of claim 14 wherein said α-olefin is a mixture of ethylene and at least one of butene-1, hexene-1 or octene-1.

16. The process of claims 1, 2, 3, 4, 5, 6 or 7 wherein said process is conducted under solution polymerization conditions.

17. The process of claim 8 wherein said process is conducted under solution polymerization conditions.

18. The process of claim 9 wherein said process is conducted under solution polymerization conditions.

19. The process of claim 19 wherein said process is conducted under solution polymerization conditions.

20. The process of claim 11 wherein said process is conducted under solution polymerization conditions.

21. The process of claim 12 wherein said process is conducted under solution polymerization conditions.

22. The process of claim 13 wherein said process is conducted under solution polymerization conditions.

23. The process of claim 14 wherein said process is conducted under solution polymerization conditions.

24. The process of claim 15 wherein said process is conducted under solution polymerization conditions.

* * * * *

UNITED STATES PATENT AND TRADEMARK OFFICE
CERTIFICATE OF CORRECTION

PATENT NO. : 4,323,665

DATED : April 6, 1982

INVENTOR(S) : Kirby Lowery, Jr., Donald F. Birkelbach, Randall S. Shipley

It is certified that error appears in the above—identified patent and that said Letters Patent is hereby corrected as shown below:

In the Abstract, line 1 "α-Olfins" should be --α-Olefins--; line 3 "tianium" should be --titanium--.

Column 3, line 51 "diethytin" should be --diethyltin--.

Column 7, line 9 sentence beginning "It is understood" should be a new paragraph.

Column 8, line 37 second "of" should be deleted.

Column 12, Claim 19, line 1 "Claim 19" should be --Claim 10".

Signed and Sealed this

Seventh Day of September 1982

[SEAL]

Attest:

Attesting Officer

GERALD J. MOSSINGHOFF

Commissioner of Patents and Trademarks